(12) United States Patent
Cvok et al.

(10) Patent No.: US 11,414,081 B1
(45) Date of Patent: Aug. 16, 2022

(54) PREDICTIVE-BASED CONTROL FOR TRANSMISSION SHIFTING

(71) Applicant: FORD GLOBAL TECHNOLOGIES, LLC, Dearborn, MI (US)

(72) Inventors: Ivan Cvok, Bistra (HR); Josko Deur, Zabreb (HR); Vladimir Ivanovic, Canton, MI (US); Yijing Zhang, Canton, MI (US); Yuji Fujii, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/167,235

(22) Filed: Feb. 4, 2021

(51) Int. Cl.
| | |
|---|---|
| *B60W 30/19* | (2012.01) |
| *F16H 61/04* | (2006.01) |
| *B60W 10/06* | (2006.01) |
| *B60W 10/02* | (2006.01) |
| *B60W 10/10* | (2012.01) |

(Continued)

(52) U.S. Cl.
CPC ............ *B60W 30/19* (2013.01); *B60W 10/02* (2013.01); *B60W 10/06* (2013.01); *B60W 10/10* (2013.01); *F16H 61/0403* (2013.01); *B60W 10/115* (2013.01); *B60W 2510/0241* (2013.01); *B60W 2510/105* (2013.01); *B60W 2510/1025* (2013.01); *B60W 2710/025* (2013.01); *B60W 2710/027* (2013.01); *B60W 2710/0666* (2013.01); *B60W 2710/10* (2013.01); *F16H 61/061* (2013.01); *F16H 2061/0411* (2013.01); *F16H 2061/0418* (2013.01); *F16H 2061/0451* (2013.01); *F16H 2061/0462* (2013.01)

(58) Field of Classification Search
CPC ...... B60W 30/19; B60W 10/02; B60W 10/06; B60W 10/10; B60W 10/115; B60W 2510/0241; B60W 2510/1025; B60W 2510/105; B60W 2710/025; B60W 2710/027; B60W 2710/0666; B60W 2710/10; F16H 61/0403; F16H 2061/451; F16H 2061/0462; F16H 2061/0418
USPC ........................................................ 477/143
See application file for complete search history.

(56) References Cited

U.S. PATENT DOCUMENTS

| | | | |
|---|---|---|---|
| 7,841,455 B2 * | 11/2010 | Maki ...................... | F16H 61/061 192/3.58 |
| 8,280,597 B2 | 10/2012 | Takahashi et al. | |
| 9,243,706 B2 | 1/2016 | Fujii et al. | |

(Continued)

FOREIGN PATENT DOCUMENTS

| | | |
|---|---|---|
| EP | 1614923 A2 | 1/2006 |
| WO | 2015110106 A1 | 7/2015 |

*Primary Examiner* — Roger L Pang
(74) *Attorney, Agent, or Firm* — Vincent Mastrogiacomo; Brooks Kushman P.C.

(57) ABSTRACT

A powertrain includes a transmission having an input shaft, an output shaft, and a plurality of clutches engageable in various combinations to establish varying power flow paths between the input and output shafts. A controller is programmed to, responsive to a shift of the transmission: reduce torque capacity of an off-going one of the clutches and increase torque capacity of an oncoming one of the clutches during a torque transfer phase of the shift, and, in response to an inertia phase of the shift, continue to command non-zero torque capacity to the off-going clutch such that the off-going clutch brakes the output shaft throughout an entire duration of the inertia phase.

12 Claims, 6 Drawing Sheets

(51) Int. Cl.
*B60W 10/115* (2012.01)
*F16H 61/06* (2006.01)

(56) References Cited

U.S. PATENT DOCUMENTS

| | | | |
|---|---|---|---|
| 9,308,908 B2 * | 4/2016 | Chen | B60W 10/06 |
| 9,759,275 B2 | 9/2017 | Gibson et al. | |
| 10,344,851 B2 | 7/2019 | Haria et al. | |

\* cited by examiner

PREDICTIVE-BASED CONTROL FOR TRANSMISSION SHIFTING

TECHNICAL FIELD

This disclosure relates to the field of control systems for automatic transmissions for motor vehicles. More particularly, the disclosure relates to a control strategy in which the off-going clutch continues to have torque capacity during the inertia phase.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

Discrete ratio transmissions are capable of transmitting power via various power flow paths, each associated with a different speed ratio. A particular power flow path is established by engaging particular shift elements, such as clutches or brakes. Shifting from one gear ratio to another involves changing which shift elements are engaged. In many transmissions, the torque capacity of each shift element is controlled by routing fluid to the shift elements at controlled pressure. A controller adjusts the pressure by sending electrical signals to a valve body.

SUMMARY

According to one embodiment, a powertrain includes a transmission having an input shaft, an output shaft, and a plurality of clutches engageable in various combinations to establish power flow paths between the input and output shafts. A controller is programmed to, responsive to a shift of the transmission: reduce torque capacity of an off-going one of the clutches and increase torque capacity of an oncoming one of the clutches during a torque transfer phase of the shift, and, in response to an inertia phase of the shift, continue to command non-zero torque capacity to the off-going clutch such that the off-going clutch brakes the output shaft throughout an entire duration of the inertia phase.

According to another embodiment, a powertrain includes an engine and a transmission having an input shaft, an output shaft, and a plurality of clutches engageable in various combinations to establish power flow paths between the input and output shafts. A controller is programmed to, responsive to a shift of the transmission: during a torque transfer phase of the shift, increase torque capacity of an oncoming one of the clutches and decrease torque capacity of an off-going one of the clutches, and, during an inertia phase of the shift, command a series of sequential torque capacities, each having different non-zero magnitudes, to the off-going clutch such that the magnitudes increase and decrease relative to each other based on measured or inferred torque of the output shaft, slip of the off-going clutch, and inertia torque associated with the input shaft.

According to yet another embodiment, a method of shifting a transmission includes, during a torque transfer phase of the shift, decreasing torque capacity of an off-going clutch to a non-zero value to initiate slip across the off-going clutch, and, during an inertia phase of the shift, continuing to maintain slip across the off-going clutch by commanding a series of sequential nonlinear torque capacities that gradually reduce to zero at termination of the inertia phase.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
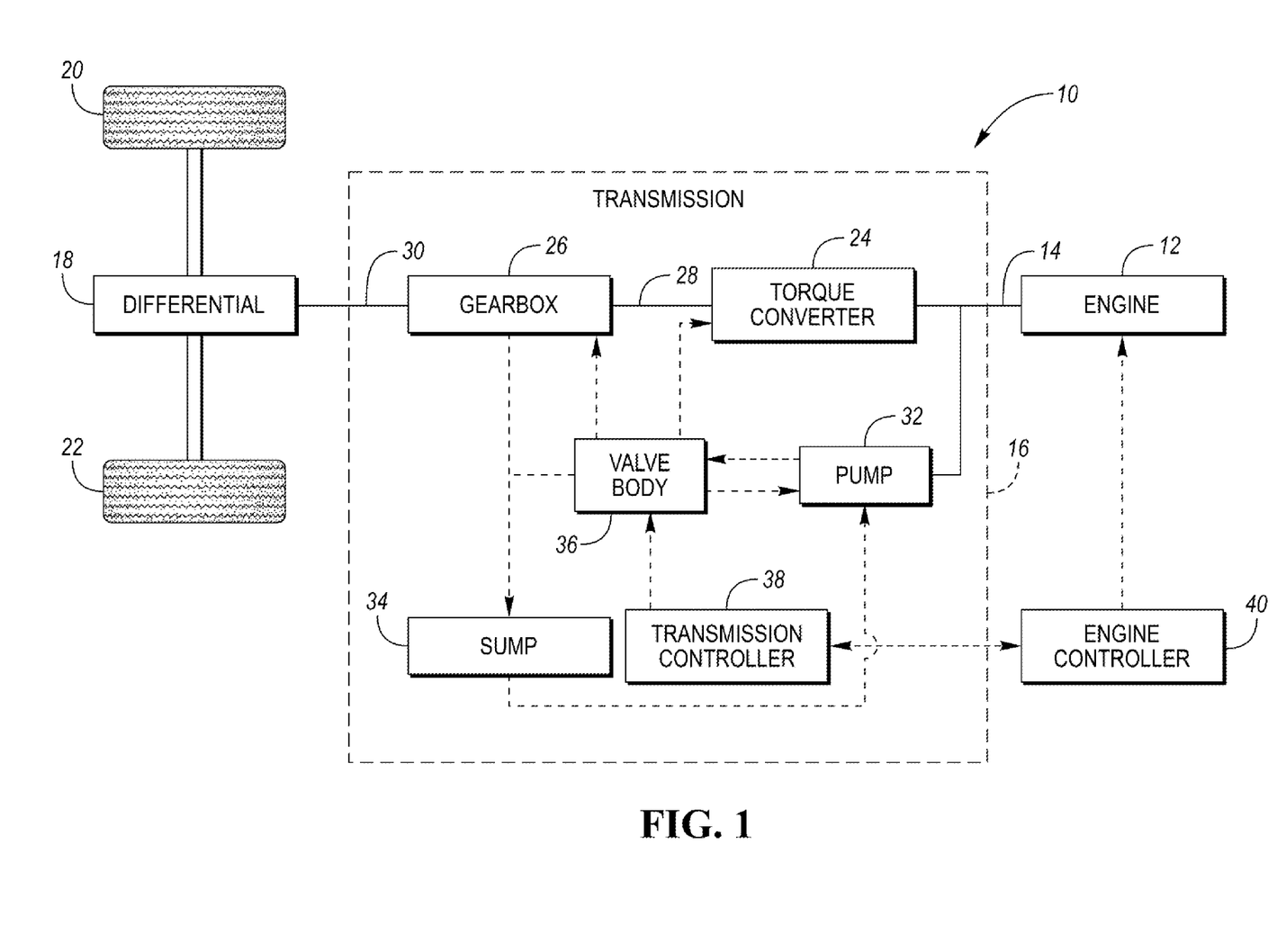
FIG. 1 is a schematic diagram of a vehicle powertrain.

FIG. 1 schematically illustrates a vehicle powertrain 10. Bold solid lines represent mechanical power flow connections. Dashed lines represent the flow of hydraulic fluid or information signals. Power provided by an actuator, such as internal combustion engine 12 or an electric motor. Transmission 16 adjusts the torque and speed to suit vehicle needs and delivers the power to differential 18. Differential 18 transmits the power to left and right rear wheels 20 and 22, permitting slight speed differences as the vehicle turns a corner.

Transmission 16 includes a torque converter 24 and a gearbox 26. Torque converter 24 transmits torque hydrodynamically based on a speed difference between an impeller which is driven by crankshaft 14 and a turbine which drives gearbox input shaft 28 (sometimes called turbine shaft). Power is transmitted from the impeller to the turbine via moving fluid whenever the impeller rotates faster than the turbine. Torque converter 24 may include a stator which redirects the fluid when the impeller is rotating substantially faster than the impeller such that the turbine torque is a multiple of the impeller torque. Gearbox 26 includes gearing and shift elements, e.g., clutches, configured to establish various power flow paths between shaft 28 and output shaft 30. Each power flow path may be established by engaging an associated subset of the shift elements. At low vehicle speed, a power flow path providing torque multiplication and speed reduction between the turbine shaft and the output shaft may be established to optimize vehicle performance. At higher vehicle speeds, a power flow path providing speed multiplication may be established to minimize fuel consumption.

The shift elements within gearbox 26 are engaged by supplying hydraulic fluid at an elevated pressure to a clutch apply chamber. Each shift element may include a clutch pack having friction plates splined to one component interleaved with separator plates splined to a different component. The fluid forces a piston to squeeze the clutch pack such that frictional force between the friction plates and the separator plates couples the components. The torque capacity of each shift element varies in proportion to changes in the fluid pressure. Pump 32, driven by crankshaft 14, draws fluid from sump 34 and delivers it at an elevated pressure to valve body 36. Valve body 36 delivers the fluid to the clutch apply chambers at a pressure controlled in accordance with signals from transmission controller 38. In addition to the fluid provided to clutch apply chambers, valve body provides fluid for lubrication and provides fluid to torque converter 24. The fluid eventually drains from gearbox 26 back to sump 34 at ambient pressure.

Engine controller 40 adjusts various actuators in the engine 12 to control the level of torque delivered at the crankshaft. For example, the controller may adjust a throttle opening, fuel injection quantity and timing, spark timing, etc. The engine controller determines the desired level of torque predominantly based on driver input via an accelerator pedal. Engine controller is in communication with transmission controller 38 and may adjust the torque output based on requests from the transmission controller. Engine controller 40 and transmission controller 38 may be separate microprocessors communicating via a controller area network or their various functions may be combined into a single microprocessor or split among more than two microprocessors.

The controllers 38 and 40 may be part of a larger control system and may be controlled by various other controllers throughout the vehicle, such as a vehicle system controller (VSC). It should therefore be understood that the controller 38, 40 and one or more other controllers can collectively be referred to as a "controller" that controls various actuators in response to signals from various sensors to control functions such as shifting the transmission, controlling engine torque, etc. Controller(s) may include a microprocessor or central processing unit (CPU) in communication with various types of computer-readable storage devices or media. Computer-readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle. The controller(s) communicates with various vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU.

Figure 2:
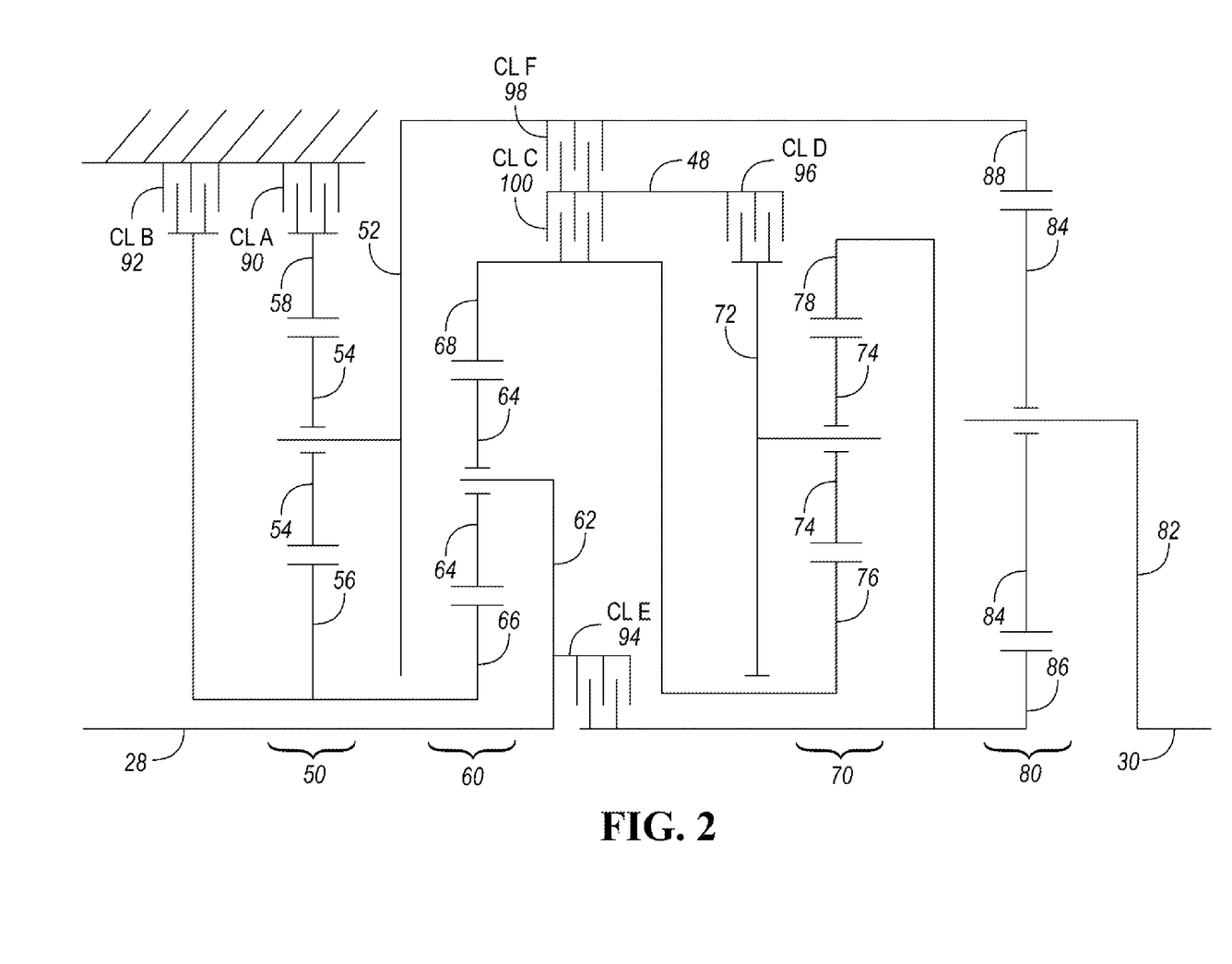
FIG. 2 is a schematic diagram of a transmission system.

An example transmission gearbox is schematically illustrated in FIG. 2. The transmission utilizes four simple planetary gear sets 50, 60, 70, and 80. Sun gear 56 is fixedly coupled to sun gear 66, carrier 52 is fixedly couple to ring gear 88, ring gear 68 is fixedly coupled to sun gear 76, ring gear 78 is fixedly coupled to sun gear 86, turbine shaft 28 is fixedly coupled to carrier 62, and output shaft 30 is fixedly coupled to carrier 82. Ring gear 58 is selectively held against rotation by brake 90 and sun gears 56 and 66 are selectively held against rotation by brake 92. Turbine shaft 28 is selectively coupled to ring gear 78 and sun gear 86 by clutch 94. Intermediate shaft 48 is selectively coupled to carrier 72 by clutch 96, selectively coupled to carrier 52 and ring gear 88 by clutch 98, and selectively coupled to ring gear 68 and sun gear 76 by clutch 100. A suggested ratio of gear teeth for each planetary gear set is listed in Table 1.

TABLE 1

| Ring 58/Sun 56 | 2.20 |
| Ring 68/Sun 66 | 1.75 |
| Ring 78/Sun 76 | 1.60 |
| Ring 88/Sun 86 | 3.70 |

As shown in Table 2, engaging the clutches and brakes in combinations of four establishes ten forward speed ratios and one reverse speed ratio between turbine shaft 28 and output shaft 30. An X indicates that the clutch is required to establish the speed ratio. An (X) indicates the clutch can be applied but is not required to establish the power flow path. In $1S^r$ gear, either clutch 98 or clutch 100 can be applied instead of applying clutch 96 without changing the speed ratio. When the gear sets have tooth numbers as indicated in Table 1, the speed ratios have the values indicated in Table 2.

TABLE 2

|  | A<br>90 | B<br>92 | C<br>100 | D<br>96 | E<br>94 | F<br>98 | Ratio | Step |
|---|---|---|---|---|---|---|---|---|
| Rev | X | X |  | X |  | X | −4.79 | 102% |
| 1st | X | X |  | (X) | X |  | 4.70 |  |
| rd | X | X | X | X |  |  | 2.99 | 1.57 |
| 3rd | X |  |  | X | X | X | 2.18 | 1.37 |
| 4th | X |  |  | X | X |  | 1.80 | 1.21 |
| 5th | X |  | X |  | X | X | 1.54 | 1.17 |
| 6th | X |  |  | X | X | X | 1.29 | 1.19 |
| 7th |  |  | X | X | X | X | 1.00 | 1.29 |
| 8th |  | X |  | X | X | X | 0.85 | 1.17 |
| 9th |  | X | X |  | X | X | 0.69 | 1.24 |
| 10th |  | X | X | X |  | X | 0.64 | 1.08 |

In operation, shift elements 90, 92, 96, and 94 may be engaged while the vehicle is stopped in Drive such that the vehicle is launched in $1^{st}$ gear. When the vehicle reaches a sufficient speed, the transmission is shifted into $2^{nd}$ gear by releasing shift element 94 and engaging shift element 100. For this shift, shift element 94 is called the off-going element (OFG) and shift element 100 is called the oncoming element (ONC). To effectuate the shift, the controller adjusts the pressures supplied to the apply chambers of these two shift elements.

Figure 3:
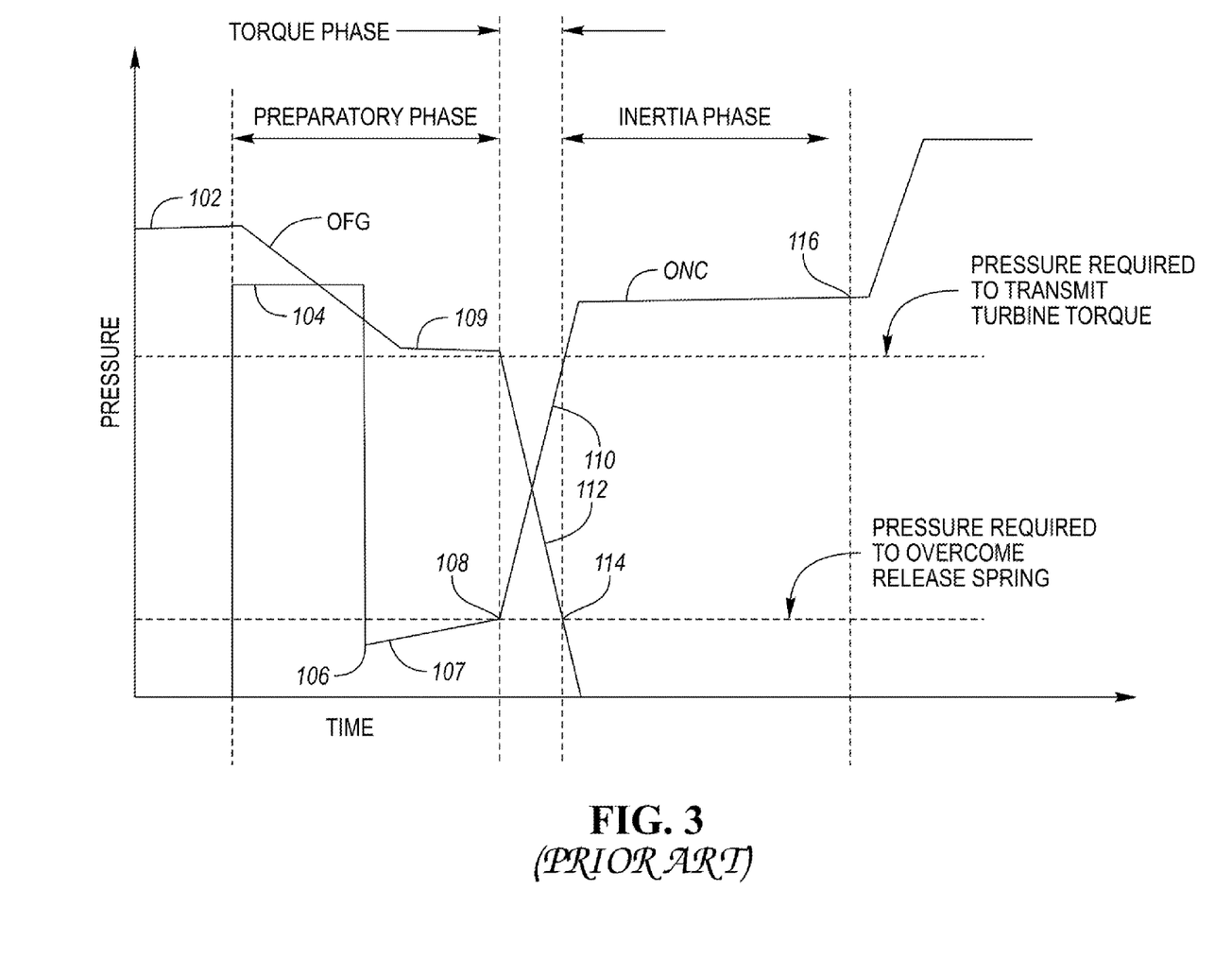
FIG. 3 is a graph of shift element pressures during a conventional upshift of a transmission such as the transmission of FIG. 1.

FIG. 3 illustrates the conventional sequence of pressure commands to effectuate an upshift. For simplicity of illustration, it is assumed that the turbine torque is constant. In practice, the turbine torque may fluctuate. A certain amount of pressure is required to overcome the return spring before the shift element gains any torque capacity. Prior to the shift, the pressure command to the off-going shift element is substantially higher than required to transmit the turbine torque as shown at 102. The pressure command to the oncoming shift element is zero. The shift proceeds in three stages: a preparatory stage, a torque phase, and an inertia phase.

During the preparatory phase, the pressures are manipulated to prepare for the shift commonly based on an open-loop approach within a given shift event, although pressure profiles may be adaptively altered for future shifts. The power transfer path does not change during this phase. The torque ratio and the speed ratio remain in the initial gear. The commanded pressure to the oncoming shift element is raised at 104 for a brief period to rapidly move the piston toward the stroked position. Although the pressure is high, the torque capacity is still zero because the piston is not yet touching the clutch pack. At 106, the pressure is dropped to slightly less than required to overcome the return spring and then gradually increased at 107 to the touch point, which is reached at 108. During the preparatory phase, the pressure of the off-going shift element is gradually reduced to a pressure just slightly above that required to transmit the current turbine torque at 109.

During the torque phase, the pressure of the oncoming shift element is ramped up at 110 while the pressure of the off-going shift element is ramped down at 112. Pressure controls are commonly based on an open-loop approach within the given torque phase, although pressure profiles may be adaptively altered for future events. In a conventional shifting process, these are coordinated such that the oncoming shift element reaches a sufficient pressure to transmit the current turbine torque in upshifted gear at very close to the same time that the torque capacity of the off-going shift element reaches zero at 114. During the torque transfer phase, power is transferred from the power flow path associated with the initial gear to the power flow path associated with the upshifted gear. Therefore, the torque ratio changes to the torque ratio of the upshifted gear. The relative speeds of the elements do not change, so the speed ratio remains at the speed ratio of the initial gear.

During the inertia phase, which begins when the speed ratio starts to change from the off-going gear to the oncoming gear, the pressure to the oncoming shift element is raised to a level higher than required to transmit the turbine torque in the upshifted gear. On-coming clutch pressure control may be based on a closed-loop approach based on clutch slip that can be calculated from available speed measurements. In a conventional shift process, the pressure to the off-going element is reduced toward zero to disengage the shift element at the onset of the inertia phase. Though it is no longer actively controlled, the off-going clutch pressure may be calibrated to maintain residual torque capacity at an insignificant level during the inertia phase based on an open-loop approach. The excess torque capacity of the oncoming element causes the turbine shaft to slow from the speed ratio associated with the initial gear toward the speed ratio associated with the upshifted gear. Off-coming clutch pressure control is commonly based on an open-loop approach during the inertia phase. The inertia phase ends at 116 when the slip across the oncoming shift element goes to zero. This is also the point at which the speed ratio reaches the speed ratio of the oncoming gear. Following the inertia phase, the pressure to the oncoming shift element is raised substantially above the pressure required to transmit turbine torque, but the actual torque transmitted by the shift element remains at the level required to transmit turbine torque.

Figure 4:
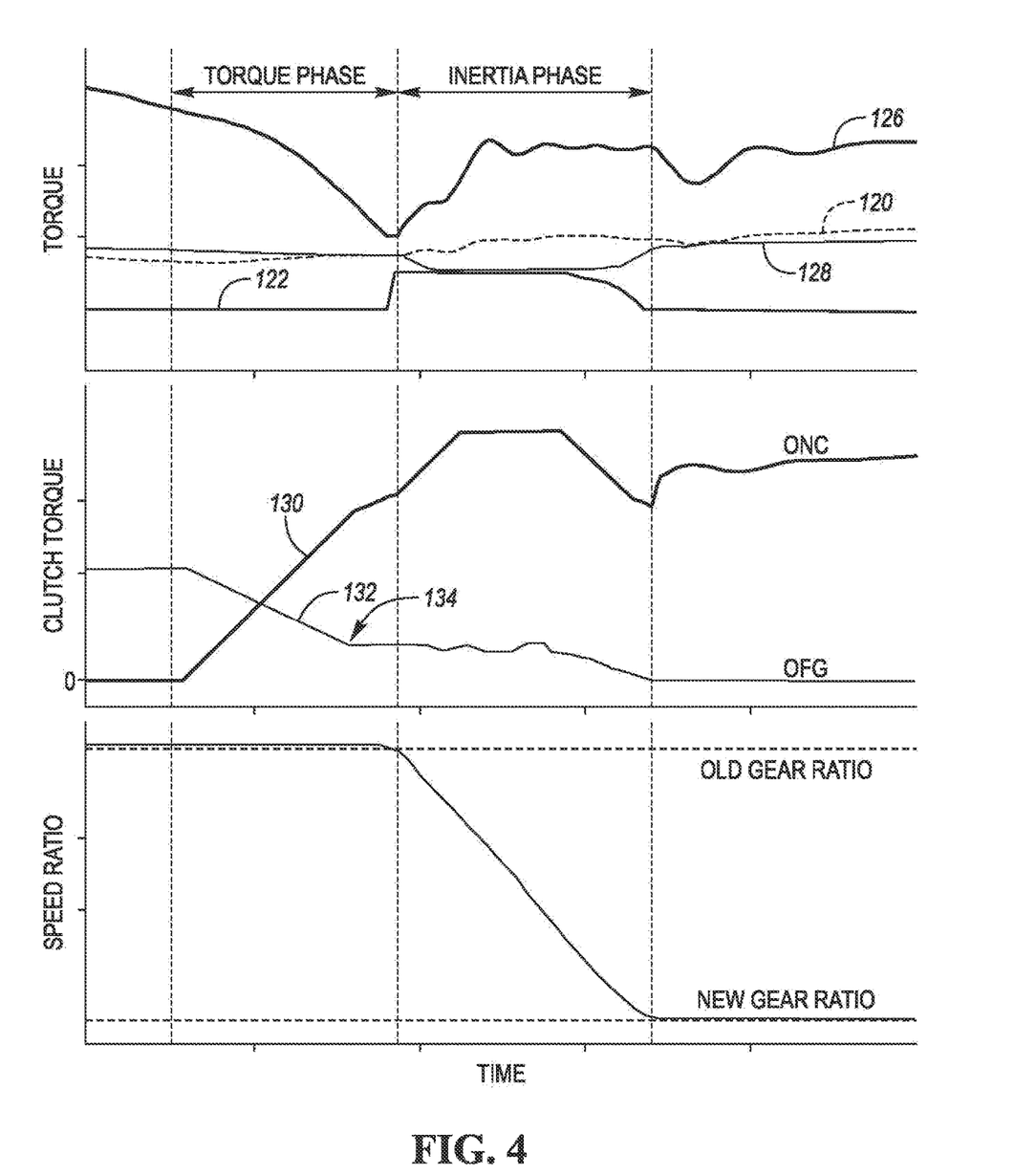
FIG. 4 is a series of plots showing variables during an upshift of a transmission.

Referring to FIG. 4, the turbine torque 120 is partly based on the torque produced by the engine 128, electric motor, etc. The torque at the output shaft is illustrated by trace 126. Specifically, the turbine torque 120 is related to the torque converter slip between the impeller and the turbine. During the inertia phase, the slip varies as the rotational speeds of the impeller and the turbine change according to engine torque and the gear ratio. The turbine torque 120 may slightly increase if the torque converter slip rises or it may decrease if the slip diminishes. The turbine torque may remain at the elevated level after the shift if the torque converter slip stays higher, given the impeller speed. The inertia torque magnitude 122 is related to the rate of change of the turbine speed. The inertia torque magnitude 122 decreases during the inertia stage and then returns to zero after the shift is completed.

The output torque 126 decreases during the torque phase as the torque ratio decreases to the torque ratio associated with the upshifted (oncoming) gear ratio. During the inertia phase, the output torque is elevated. The elevated output torque 126 and the inertia torque 122 are both a result of the oncoming clutch torque capacity being greater than that required to transmit the turbine torque 120. As shown, following the upshift, the output torque 126 is less than it was before the upshift due to the reduced torque ratio associated with the upshifted gear. This is mitigated somewhat by the increased turbine torque 120.

FIG. 4 also illustrates the clutch torque capacities of the oncoming clutch 130 and the off-going clutch 132. The torque capacities shown are absolute values and do not denote direction. During the torque phase, the off-going torque capacity 132 is reduced gradually to a non-zero value 134 so that the off-going clutch is still partially engaged (slipping) during the inertia phase. The oncoming torque capacity 130 may be increased more rapidly. At some point during the torque transfer phase, the torque capacity 130 of the oncoming clutch exceeds the level required to transmit turbine torque. At this point, the torque transmitted by the off-going clutch 132 changes direction and the gears are in a state of "tie-up" because the off-going clutch is yet to start slipping due to its capacity that is controlled to stay substantially higher than zero.

At the end of the torque transfer phase, the off-going clutch begins to slip, while the hydraulic actuator pressure of the off-going element remains substantially higher than the piston stroke level and torque capacity continues into the inertia phase. Instead of further reducing the torque capacity of the off-going shift element at this point, the torque capacity is maintained during the inertia phase. The oncoming clutch torque capacity 130 is raised to a level that overcomes the resistance of the dragging off-going clutch. The capacity of the oncoming clutch 130 may be controlled as known in the art.

Unlike conventional designs, in which the off-going clutch has zero torque capacity, the torque capacity 132 of the off-going clutch is maintained substantially above a zero value throughout at least a majority of the inertia phase, and in some instances, the entire inertia phase. That is, the off-going clutch torque capacity 132 gradually reduces from an initial value to zero at the end of the inertia phase. The off-going clutch torque capacity 132 may be controlled using closed-loop controls during the inertia phase to modulate its amplitude. The closed-loop controls also provide torque values for the engine and the oncoming clutch.

Transmission performance can be improved by reducing shift times while also providing a smooth transition between the off-going gear and the oncoming gear. Shift time and smoothness are often competing interests and it is difficult to provide both at the same time. The above-described controls provide shifts that are both quick and smooth by using closed-loop controls of both the oncoming and off-going clutches and the engine torque. The controller 38 and/or 40 or another controller may be programmed to execute the below-described controls.

The closed-loop control methodology robustly and automatically coordinates torque profiles from input torque source, the oncoming clutch and off-going clutch in real time for completing shifting within desired time and with optimized shift quality and thermal energy levels.

Figure 5:
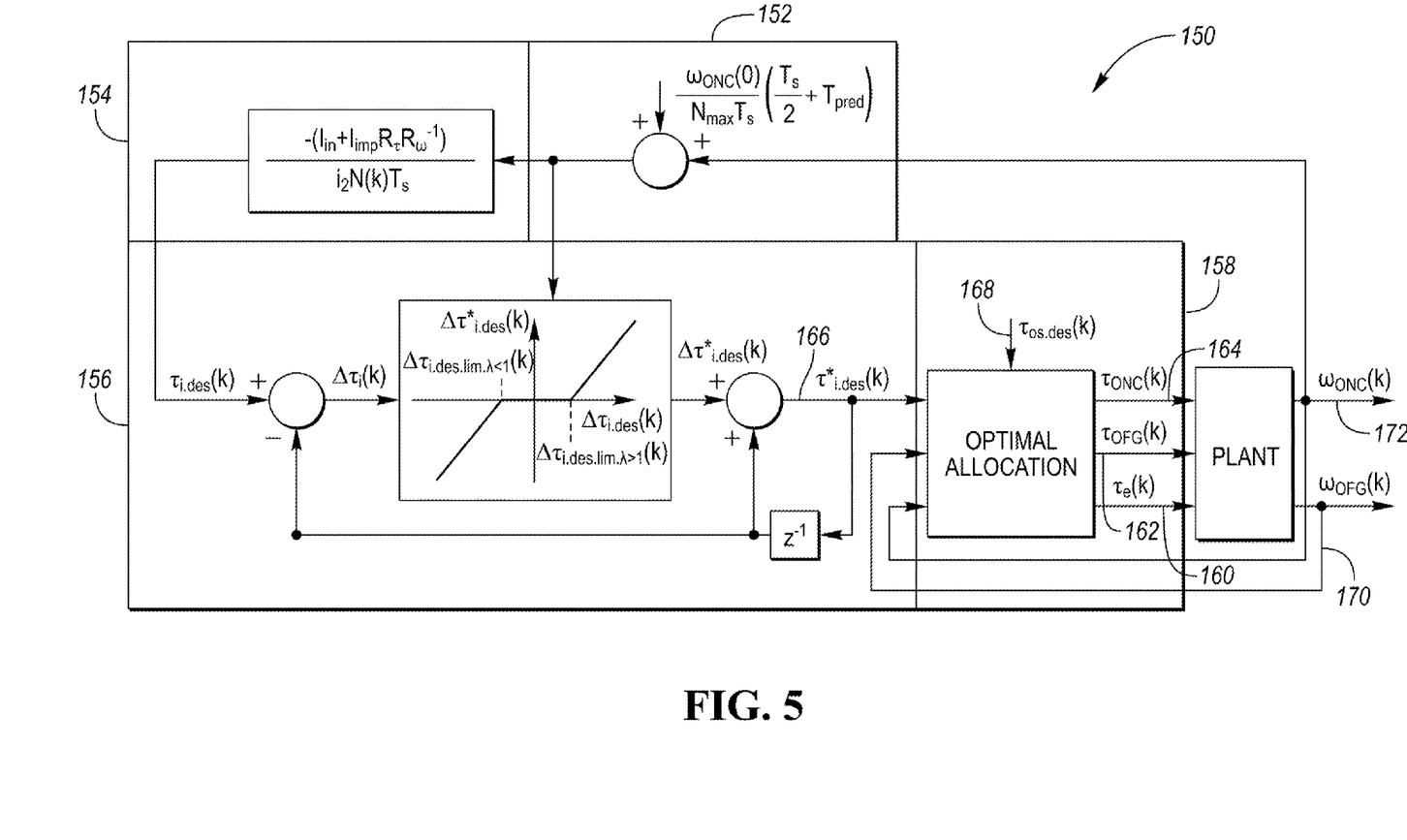
FIG. 5 is a control diagram for controlling clutch torque capacity and turbine torque during a transmission shift.

Referring to FIG. 5, the controls may include a Static Model-Based Predictive Control with optimal allocation for coordinating input torque, oncoming clutch capacity and off-going clutch capacity to achieve a desired inertia phase duration toward optimized shift quality and clutch thermal efficiency based on clutch slip-speed feedback. Controls 150 may include four main elements: oncoming clutch relative speed compensation 152, inertial torque calculation 154, inertial torque modification with dead-zone 156, and optimal allocation of torque commands 158.

The element 152 provides compensation for discrete closed-loop control sampling delay and actuation delays ($T_s/2+T_{pred}$), where $T_s$ is the control sampling time and $T_{pred}$ is the predicted torque delivery time delay, to improve the torque calculation accuracy (compensated speed is intended to correspond to the oncoming clutch slip speed at the instant when the calculated torque commands are delivered). The element 154 calculates an inertia torque based on the desired shift duration and clutch slip-speed feedback on a diminishing horizon. The element 156 calculates a final inertia torque for the optimal allocation element 158. A control signal difference dead-zone may be applied to computation of the final inertial torque to avoid oscillations and chattering in the calculated signal as explained below.

The optimal allocation 158 outputs the final torque command of the engine 160, the torque capacity 162 of the off-going clutch, and the torque capacity 164 of the oncoming clutch. Clutch torque capacities 162, 164 and input torque 160 commands may be allocated using instantaneous, on-line minimization of a cost function that reflects clutch power loss, shift comfort, and shift duration. The shift comfort target may be set by a desired output shaft torque profile $\tau_{os,des}$ from a static transmission model. The shift duration may be a soft constraint to satisfy the desired inertia torque $\tau^*_{i,des}$. The optimization problem may be given by equation 1 (below) subject to hard constraints related to torque commands' amplitude and rate limits. Cost function minimization of equation 1 may be performed by using a process for solving mathematical optimization problems such as Quadratic Programming (QP) as explained below.

$$\min_{\tau_e, \tau_{ONC}, \tau_{OFG}} J = \underbrace{k_{ONC} P^2_{ONC} + k_{OFG} P^2_{OFG}}_{\text{Efficiency}} + \underbrace{k_{os}(\tau_{os,des} - \tau_{os})^2}_{\text{Shift comfort}} + \underbrace{k_{is}(\tau^*_{i,des} - \tau_i)^2}_{\text{Shift duration}} \quad \text{(Eq. 1)}$$

Here, $k_{ONC}$, $k_{OFG}$, $k_{os}$, and $k_{is}$ are the objective function weights representing tuning parameters; $P_{ONC}$ and $P_{OFG}$ are the clutch energy dissipation powers; $\tau_{os,des}$ and $\tau_{os}$ are the desired and predicted output shaft torques; $\tau^*_{i,des}$ is the final desired inertia torque; and $\tau_i$ is the predicted inertia torque.

The clutch dissipation powers are given by equations 2 and 3, where $\omega_{ONC}$ and $\omega_{OFG}$ are the oncoming and offgoing clutch slip speeds.

$$P_{ONC} = \omega_{ONC} \tau_{ONC} \quad \text{(Eq. 2)}$$

$$P_{OFG} = \omega_{OFG} \tau_{OFG} \quad \text{(Eq. 3)}$$

The predicted output shaft torque is given by equation 4:

$$\tau_{os} = c_{ONC} \tau_{ONC} + c_{OFG} \tau_{OFG} + c_e \tau_e \quad \text{(Eq. 4)}$$

where:

$$c_{ONC} = \frac{1}{g_2} + \frac{I_{io} R_{\dot\omega} i_2}{I_{in} R_{\dot\omega} + I_{imp} R_\tau}$$

$$c_{OFG} = \frac{1}{g_1} + \frac{I_{io} R_{\dot\omega} i_1}{I_{in} R_{\dot\omega} + I_{imp} R_\tau}$$

$$c_e = -\frac{I_{io} R_{\dot\omega} R_\tau}{I_{in} R_{\dot\omega} + I_{imp} R_\tau}$$

Here, $i_1$ and $g_1$ are the input shaft and output shaft to OFG clutch speed ratios (note: $\omega_{OFG} = i_1 \omega_{in} - g_1^{-1} \omega_{os}$ where $\omega_{in}$ and $\omega_{out}$ are the transmission input and output speeds), $i_2$ and $g_2$ are the input shaft and output shaft to ONC clutch speed ratios (note: $\omega_{ONC} = i_2 \omega_{in} - g_2^{-1} \omega_{os}$), $I_{in}$ is the total gearbox input shaft moment of inertia, $I_{imp}$ is the impeller moment of inertia, $I_{io}$ is the cross-coupling inertia that defines relation between the input and output accelerations for particular transmission neutral state, $R_\tau$ is the torque converter torque ratio, $R_{\dot\omega}$ is the torque converter acceleration ratio. The equations are given for a more generic case of an open torque converter. The corresponding coefficients ($R_\tau$ and $R_{\dot\omega}$) may be obtained by linearization of the torque converter maps. In case when the torque converter is closed, the coefficients are equal to 1, i.e. $R_\tau = 1$ and $R_{\dot\omega} = 1$.

The predicted inertia torque $\tau_i$ is given by equation 5:

$$\tau_i = -i_2 \tau_{ONC} - i_1 \tau_{OFG} + R_\tau \tau_e \quad \text{(Eq. 5)}$$

The final desired inertia torque $\tau^*_{i,des}$ may be computed as follows. First, desired inertia torque is computed using equation 6:

$$\tau_{i,des} = -\frac{I_{in} + I_{imp} R_\tau R_{\dot\omega}^{-1}}{i_2 N(k) T_s} \omega_{ONC} \quad \text{(Eq. 6)}$$

where $T_s$ is the controller sampling time and N is the length of diminishing prediction horizon (number of control steps until the inertia phase end). Next, difference relative to the previous control step (k−1) value is computed by equation 7:

$$\Delta \tau_{i,des} = \tau_{i,des}(k) - T^*_{i,des}(k-1) \quad \text{(Eq. 7)}$$

Finally, the final value may be computed by applying a dead-zone to the computed difference and adding previous step value (k−1):

$$\tau_{i,des}^* = \begin{cases} \tau_{i,des}^*(k-1) + \Delta\tau_{i,des} - \Delta\tau_{i,des,lim,\lambda>1}, & \text{if } \Delta\tau_{i,des} > \Delta\tau_{i,des,lim,\lambda>1} \\ \tau_{i,des}^*(k-1) + \Delta\tau_{i,des} - \Delta\tau_{i,des,lim,\lambda<1}, & \text{if } \Delta\tau_{i,des} < \Delta\tau_{i,des,lim,\lambda<1} \\ \tau_{i,des}^*(k-1), & \text{otherwise} \end{cases}$$

with the dead-zone limits calculated as:

$$\Delta\tau_{i,des,lim} = \frac{I_{in} + I_{imp}R_\tau R_\omega^{-1}}{i_2}\left(\frac{1}{N(k)T_S} - \frac{1}{\lambda N(k)T_S}\right)\omega_{ONC}(k)$$

where λ-factor is the tuning parameter that defines the dead-zone width. Lower dead-zone limit is defined by λ<1 (e.g. 0.9). Upper dead-zone limit is defined by λ>1 (e.g. 1.1).

Substituting the objective function terms with their definitions and rearranging yields the quadratic program (QP) formulation of the problem that can be efficiently solved in real-time.

The QP problem is given by equation 8:

$$\min_\tau J = \frac{1}{2}\tau^T H\tau + f^T\tau + S \tag{Eq. 8}$$

subject to linear inequality constraints:

$$A_{ineq}\tau \leq B_{ineq}$$

where:

$$\tau = [\tau_e \quad \tau_{ONC} \quad \tau_{OFG}]^T$$

$$H = \begin{bmatrix} 2(k_{os}c_e^2 + k_{is}R_\tau^2) & 2k_{os}c_{ONC}c_e - 2k_{is}R_\tau i_2 & 2k_{os}c_{OFG}c_e - 2k_{is}R_\tau i_1 \\ 2k_{os}c_{ONC}c_e - 2k_{is}R_\tau i_2 & 2(k_{ONC}\omega_{ONC}^2 + k_{os}c_{ONC}^2 + k_{is}i_2^2) & 2k_{os}c_{ONC}c_{OFG} + 2k_{is}i_1 i_2 \\ 2k_{os}c_{OFG}c_e - 2k_{is}R_\tau i_1 & 2k_{os}c_{ONC}c_{OFG} + 2k_{is}i_1 i_2 & 2(k_{OFG}\omega_{OFG}^2 + k_{os}c_{OFG}^2 + k_{is}i_1^2) \end{bmatrix}$$

$$f = \begin{bmatrix} -2k_{os}c_e\tau_{os,des} - 2k_{is}\tau_{i,des}^* R_\tau \\ -2k_{os}c_{ONC}\tau_{os,des}^* + 2k_{is}\tau_{i,des}^* i_2 \\ -2k_{os}c_{OFG}\tau_{os,des}^* + 2k_{is}\tau_{i,des}^* i_1 \end{bmatrix}$$

$$S = k_{os}\tau_{os,des}^2 + k_{is}\tau_{i,des}^{*2}$$

$$A_{ineq} = \begin{bmatrix} 1 & 0 & 0 \\ -1 & 0 & 0 \\ 1 & 0 & 0 \\ -1 & 0 & 0 \\ 0 & 1 & 0 \\ 0 & -1 & 0 \\ 0 & 1 & 0 \\ 0 & -1 & 0 \\ 0 & 0 & 1 \\ 0 & 0 & -1 \\ 0 & 0 & 1 \\ 0 & 0 & -1 \end{bmatrix}$$

$$B_{ineq} = \begin{bmatrix} \tau_e(k-1) + \Delta\tau_{e,max} \\ -\tau_e(k-1) + \Delta\tau_{e,min} \\ \tau_{e,max} \\ -\tau_{e,min} \\ \tau_{ONC}(k-1) + \Delta\tau_{ONC,max} \\ -\tau_{ONC}(k-1) + \Delta\tau_{ONC,min} \\ \tau_{ONC,max} \\ -\tau_{ONC,min} \\ \tau_{OFG}(k-1) + \Delta\tau_{OFG,max} \\ -\tau_{OFG}(k-1) + \Delta\tau_{OFG,min} \\ \tau_{OFG,max} \\ -\tau_{OFG,min} \end{bmatrix}$$

Note that the constant term in the objective function S can be omitted since it does not affect the optimal solution of the problem.

As shown by the above equations and FIG. 5, the transmission is controlled by a closed-loop controls that utilize the final inertia torque 166, an inferred (or measured) output shaft torque 168, a slip speed 170 of the off-going clutch, and a slip speed 172 of the oncoming clutch. Based on at least these feedback parameters, the controls 150 command the clutch torque capacities 162, 164 and the engine torque 160.

Figure 6:
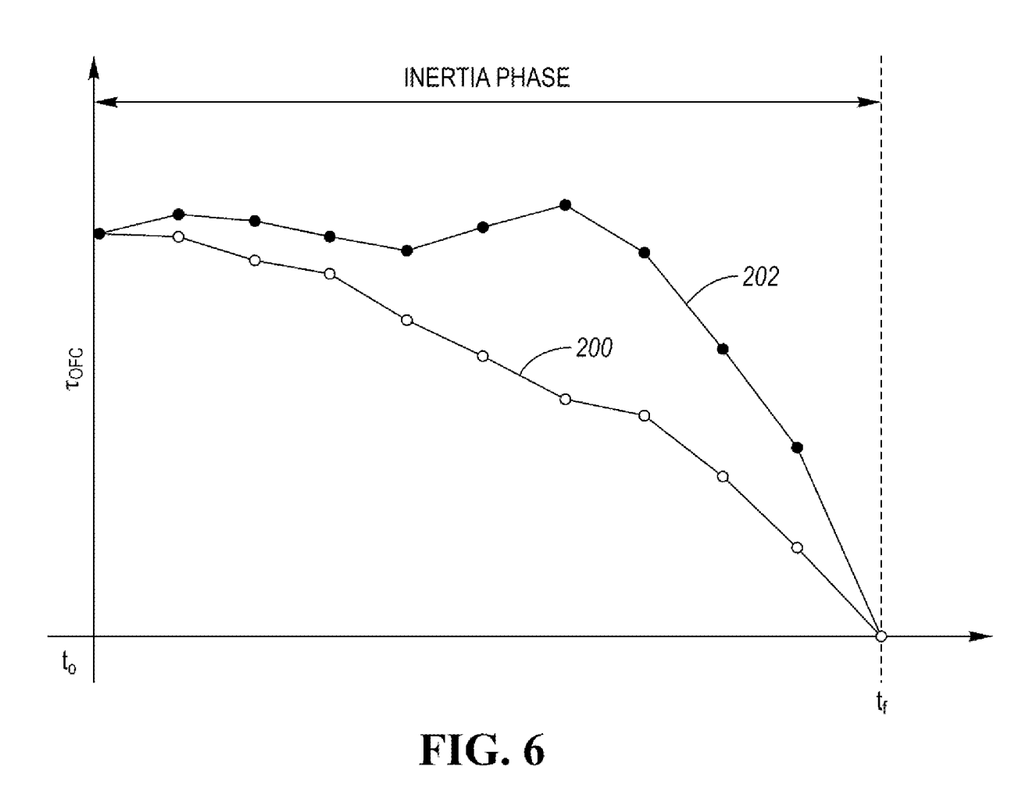
FIG. 6 is a pair of plots showing alternative controls for the off-going clutch during an inertia phase of a transmission shift.

Referring to FIG. 6, the controller is programmed to command a series of sequential torque capacities (represented by dots), each having different non-zero magnitudes, to the off-going clutch such that the magnitudes increase and decrease relative to each other based on torque of the output shaft, slip of the off-going clutch, and/or inertia torque associated with the input shaft as shown in controls 150. The magnitudes generally decrease from the initial value, which may have the largest magnitude, at the start ($t_0$) on the inertia phase to the last value ($t_f$), which may be zero, at the end (terminus) of the inertia phase. (The off-going clutch capacity may become zero before the end of the inertia phase.) This general decrease may be monotonic, i.e., always decrease forward in time, as shown by trace 200, or may be non-monotonic, i.e., increases and decreasing forward in time with a general trend towards zero, as shown by trace 202. In both embodiments, the sequential torque capacities are dynamic values calculated in real time based on the closed-loop controls. This may result in the rates of change between adjacent torque capacity demands varying, i.e., the traces 200/202 are not linear. In the case of the non-monotonic embodiment, the torque capacity 202 is increased and decreased to optimize the cost function. The monotonic trace 200 may be achieved by limiting the capacity commands so that subsequent torque capacity commands never exceed the previous torque capacity command.

The above-described controls may include piecewise-linear adaptive open-loop controls, augmented by limited closed-loop actions for coordinating the controls of input torque, ONC, and OFG during the inertia phase. The proposed controls/methods are designed to complement current shifting methodology and is readily implementable with current automatic transmission. The control strategy includes feedback action complimented with model-based prediction and as such provides robustness in the presence of clutch/engine torque delivery errors and other uncertainties. These controls provide a reduce shift time while also providing smooth shifting.

While discussed in an engine powered vehicle, the controls of this disclosure are equally applicable to hybrid and electric vehicles having multi-speed automatic transmission.

Listing of Abbreviations $T_s$=sampling time
N=length of diminishing prediction horizon
k=control step
$\tau_i$=inertia torque
$\tau^*_i$=final inertia torque
$T_e$=engine/input torque
$T_{ONC}$=oncoming clutch torque
$T_{OFG}$=offgoing clutch torque
$\tau_{os}$=output shaft torque
$\omega_{ONC}$=oncoming clutch slip speed
$\omega_{OFG}$=offgoing clutch slip speed
$i_2$=input shaft to ONC clutch input speed ratio
$i_1$=input shaft to OFG clutch input speed ratio
$I_{in}$=gearbox input shaft moment of inertia
$I_{imp}$=impeller moment of inertia
$I_{io}$=cross-coupling inertia that defines relation between the input and output accelerations for particular transmission neutral state
$R_\tau$=torque converter torque ratio
$R_\omega$=torque converter acceleration ratio
P=Power loss
$c_e, c_{ONC}, c_{OFG}$=static prediction model gains for relations between the engine and output torque, oncoming clutch and output torque, and offgoing clutch and output torque, respectively.
$\lambda$=dead-zone tuning parameter While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A powertrain comprising: a transmission having an input shaft, an output shaft, and a plurality of clutches engageable in various combinations to establish power flow paths between the input and output shafts; and a controller programmed to, responsive to a shift of the transmission: reduce torque capacity of an off-going one of the clutches to a non-zero torque capacity and increase torque capacity of an oncoming one of the clutches during a torque transfer phase of the shift, and in response to an inertia phase of the shift, continue to command the non-zero torque capacity to the off-going clutch such that the off-going clutch brakes the output shaft during the inertia phase, wherein the command of the non-zero torque capacity further includes increasing and decreasing the non-zero torque capacity during the inertia phase based on a slip of the off-going clutch.

2. The powertrain of claim 1, wherein the non-zero torque capacity is based on an inertia torque associated with the input shaft and a torque of the output shaft.

3. The powertrain of claim 2, wherein the non-zero torque capacity is further based on a slip of the oncoming clutch.

4. The powertrain of claim 1, wherein the non-zero torque capacity is commanded throughout at least a majority of the inertia phase.

5. The powertrain of claim 1, wherein the non-zero torque capacity is commanded throughout an entire duration of the inertia phase.

6. A powertrain comprising: a transmission having an input shaft, an output shaft, and a plurality of clutches engageable in various combinations to establish power flow paths between the input and output shafts; and a controller programmed to, responsive to a shift of the transmission: reduce torque capacity of an off-going one of the clutches and increase torque capacity of an oncoming one of the clutches during a torque transfer phase of the shift, and in response to an inertia phase of the shift, command non-zero torque capacity to the off-going clutch such that the off-going clutch brakes the output shaft throughout an entire duration of the inertia phase, wherein the command of the non-zero torque capacity further includes increasing and decreasing the non-zero torque capacity during the inertia phase based on a slip of the oft-going clutch.

7. The powertrain of claim 6, wherein the non-zero torque capacity is based on an inertia torque associated with the input shaft and a torque of the output shaft.

8. The powertrain of claim 7, wherein the non-zero torque capacity is further based on a slip of the oncoming clutch.

9. A method of shifting a transmission having an input shaft, an output shaft, and a plurality of clutches engageable in various combinations to establish power flow paths between the input and output shafts, the method comprising: via a vehicle controller: reducing torque capacity of an off-going one of the clutches and increase torque capacity of an oncoming one of the clutches during a torque transfer phase of the shift; and in response to an inertia phase of the shift, command non-zero torque capacity to the off-going clutch such that the off-going clutch brakes the output shaft throughout an entire duration of the inertia phase, wherein the command of the non-zero torque capacity further includes increasing and decreasing the non-zero torque capacity during the inertia phase based on a slip of the off-going clutch.

10. The method of claim 9, wherein the non-zero torque capacity is a series of sequential nonlinear torque capacities that are gradually reduced non-monotonically.

11. The method of claim 9, wherein the non-zero torque capacity is a series of sequential nonlinear torque capacities that are increased and decreased based on the slip of the off-going clutch and a slip of an oncoming clutch.

12. The method of claim 9, wherein rates of change between adjacent ones of the torque capacities varies.

* * * * *